Patented June 29, 1954

2,682,445

UNITED STATES PATENT OFFICE 2,682,445

PROCESS FOR THE PRODUCTION OF PURIFIED ANHYDROUS ZIRCONIUM TETRAHALIDE

Walter Frey, Basel, Switzerland, assignor to Saurefabrik Schweizerhall, Schweizerhalle, Switzerland, a corporation of Switzerland No Drawing. Application July 8, 1952, Serial No. 297,781

Claims priority, application Switzerland July 23, 1951

12 Claims. (Cl. 23—87)

This invention relates to a process for the production of purified anhydrous zirconium tetrahalide from impure zirconium tetrahalide and, more particularly, to a process for the purification of impure anhydrous zirconium tetrahalide as produced by a halogenation, especially a chlorination of zirconium containing materials.

In the halogenation, especially the chlorination of zirconium ores, such as Baddeleyite and zircon, or in the halogenation of zirconium compounds, such as zirconium carbide, or of zirconium metal, a zirconium halide is recovered which in most cases is contaminated with halides of various kinds. The crude or impure zirconium chloride, for example, always contains major or minor amounts of ferric chloride. An elimination or substantial elimination of ferric chloride from the zirconium tetrachloride by physical treatments only, such as a fractional sublimation, is not possible because the sublimation points of the two chlorides lie very close to each other.

Likewise, the production of high purity zirconium tetrahalide, such as zirconium tetrachloride, from mixtures of solid halides or chlorides which are obtained as by-products in the halogenation of composite ores containing zircon in various concentrations is very difficult. For example, in the chlorination of titanium bearing materials containing zircon, such as rutile, mixed solid chlorides are obtained as by-products containing in addition to zirconium tetrachloride considerable amounts of ferric chloride, aluminum chloride, and other chlorides. The separation of the chloride impurities from the anhydrous zirconium tetrachloride to produce high purity products is extremely difficult and cannot be achieved by a conventional physical separation of volatilized chlorides.

It has now been found that zirconium halide with a low concentration of iron and other chlorides can be produced by heating an impure anhydrous zirconium tetrahalide containing halide impurities including ferric halide, in intimate admixture with an organic substance that carbonizes in the presence of the zirconium tetrahalide below its sublimation point, to a temperature at which the zirconium tetrahalide vaporizes. In the process, the organic substance is carbonized and the carbonized organic substance binds the impurities to such an extent that the zirconium tetrahalide is vaporized from the mass in a highly purified form. For instance, the process may be carried out by intimately mixing a solid contaminated anhydrous zirconium tetrahalide with an organic substance carbonizing in the presence of the crude or impure halide below the sublimation point of the zirconium halide, particularly an oleaginous or oily organic liquid, and then heating the mixture to a temperature below the sublimation point of the zirconium tetrahalide at which the organic substance is carbonized and binds the impurities and thereafter further heating the mixture to vaporize the purified zirconium tetrahalide. The intimate mixing of the solid halide, particularly chloride, with the organic substance produces an organic layer, such as an oil layer, on the normally solid zirconium halide. If the zirconium halide then is heated to the volatilization point, apparently a reaction of the ferric halide and the other halides occurs with this layer which thereby carbonizes and retains the ferrous halide produced by the reduction process and surprisingly also aluminum halide and other anhydrous halides. During the subsequent volatilization of the zirconium tetrachloride a product of much improved purity is obtained.

It has further been found that the zirconium halide can be obtained with a still higher degree of purity by mixing solid crude or other impure anhydrous zirconium halides with an organic substance carbonizing in the presence of the crude halide below the sublimation point of the zirconium halide dissolved in a readily volatilized, substantially anhydrous solvent which is unreactive with zirconium halide. Organic substances which are solid or highly viscous oils are particularly advantageously mixed in this manner. By heating the formed mixture to the sublimation point of the zirconium tetrahalide, the volatile solvent is distilled off, the organic substance is carbonized, and substantially pure zirconium tetrahalide is vaporized. By mixing the solid halide with such a solution and by subsequently vaporizing the solvent, the organic substance is distributed most evenly over all of the zirconium tetrahalide. A very thin organic film, such as an oil film, is formed all over the surfaces of the halide crystals. Upon heating the formed mixture to the volatilization point of the zirconium tetrahalide, every crystal of the halide, as small as it may be, being covered with this film, reacts with the ferric halide and the other halides, thereby carbonizing and retaining the halides of iron and the other elements. During the subsequent volatilization of the zirconium tetrahalide a product practically free of impurities is obtained.

The zirconium tetrahalide can be vaporized at normal pressure by sublimation. However, it is possible to work at a pressure sufficiently elevated to cause the zirconium halide to be liquefied before the sublimation temperature is reached and the volatilization then occurs in the form of a distillation.

Although oily or oleaginous materials are generally preferred in the process of this invention, solid organic substances which carbonize in the presence of zirconium tetrahalide at temperatures below its sublimation point may also be used. Such solid substances include animal and vegetable fats, such as stearine, or solid hydrocarbons, such as paraffin and anthracene. Suitable oils carbonizing under the treatment conditions of this invention include especially the high molecular weight oils, such as various mineral oils, but vegetable oils may also be used, such as linseed oil, olive oil, etc. Furthermore, the organic substance which is carbonized in the process of this invention may be produced during the vaporization of the readily volatilized solvent from an ingredient contained therein, such as by a cracking or polymerization process.

Suitable volatile solvents are especially easily volatilizable halogenated solvents, such as carbon tetrachloride and tetrabromide; liquid hydrocarbon halides, such as phenyl fluoride, chloroform, chlorobenzene, ethylene tetrachloride; hydrocarbons, such as benzine, benzene, and other lower boiling hydrocarbons; readily volatilized liquid metal and silicon halides, such as silicon tetrabromide and tetrachloride, titanium tetrachloride, and also liquefied sulfur dioxide, etc. The boiling point of the solvent preferably should be about 100° C. below the sublimation point of the zirconium tetrahalide in order that the solvent can be distilled off as completely as possible before the sublimation of the halide. In order to prevent a reaction of the solvent with the zirconium tetrahalide, the use of a solvent as anhydrous as possible is recommended. Low boiling hydrocarbons, carbon tetrachloride, halogenated hydrocarbons, liquid sulfur dioxide, and readily volatilized liquid metal halides and silicon halides may be used in the process of this invention to particular advantage.

The quantity of the organic substance to be carbonized depends on the chemical nature of the substance and on the concentration of iron and other halides in the zirconium tetrahalide and normally amounts to only a minor percentage or usually only a small percentage, such as 0.1 to 5%, of the weight of the zirconium tetrahalide to to purified. In some cases the small amounts of higher boiling organic substances contained in the readily volatilized liquid anhydrous organic substances, for example, industrial solvents, such as benzine, or organic substances produced from the solvent during its distillation in the presence of the crude zirconium halide are sufficient to supply the organic substances which carbonize in the present process. Where the organic substance which carbonizes in the process is supplied with the volatile solvent, a major part of the organic solvent is vaporized only and a minor part is retained to be heated with the halide to be carbonized and bind the contaminations. By further heating purified zirconium halide is recovered. Regardless of whether the organic substances which carbonize in the presence of the impure zirconium tetrahalide are added per se or are formed in situ, it is important that the impure zirconium tetrahalide be in intimate admixture with the organic substance before heating the mixture to temperatures which carbonize the organic substance and vaporize the zirconium tetrahalide.

In order to obtain a maximum yield of purified zirconium tetrachloride, the amount of the organic substance should not considerably exceed the amount necessary for the reaction with the halide of iron and the other contaminations. Otherwise, a substantial amount of zirconium tetrahalide may react with the organic substance causing a considerably lesser recovery of purified halide. The purification with a solution permits a very good control of the process in this respect and therefore gives the highest possible yields.

The amount of solvent used in this process preferably is determined in such a way that the solid chloride will be wetted completely. The total amount of the solvent can be distilled off or a part of it can be separated from the zirconium chloride first by filtration or decantation and only the remainder distilled off. In the latter case, the concentration of the organic substance in the solvent should be higher than in the first case due to the fact that the amount of organic substance drawn off in the filtrate will not be available for the carbonizing step. The vaporization of the solvent can be performed at normal or elevated pressure or under a vacuum.

When using solvents in which zirconium chloride itself is soluble, as, for example, when using liquid sulfur dioxide, a solution of zirconium tetrachloride and the organic substance in this solvent can first be produced. Thereafter the solvent is vaporized off and then the zirconium chloride is sublimed. Of course, a very intimate admixture of the organic substance and the anhydrous zirconium tetrahalide is obtained in the mutual solvent.

Customary types of sublimation apparatus may be used for carrying out the process of this invention. The mixing of the halide with the purification agent and the vaporization of the solvent may be performed within a sublimation vessel constructed, for example, of steel. A tubular cooler may be connected to the sublimation vessel for the condensation of the solvent. The condensation of the pure halide vapors preferably is done within an empty cooled condensation chamber.

The practice of the invention will be further understood from the following examples which constitute illustrative embodiments thereof.

*Example 1*

Twenty gr. of an impure anhydrous $ZrCl_4$ containing 0.5% $FeCl_3$ were mixed with 50 ml. of $CCl_4$ containing 0.4 gr. of motor oil; the $CCl_4$ was distilled off and the $ZrCl_4$ was sublimed. The sublimed $ZrCl_4$ contained less than 0.0025% $FeCl_3$.

*Example 2*

Twenty gr. of the same $ZrCl_4$ as in Example 1 were mixed with 50 ml. of refined benzine having a boiling point of 60 to 90° C. and containing 0.2 gr. of motor oil. Then the benzine was vaporized and the $ZrCl_4$ was sublimed. A purified $ZrCl_4$ containing about 0.004% $FeCl_3$ was obtained.

*Example 3*

The same amount of an impure anhydrous $ZrCl_4$ as in Examples 1 and 2 was mixed with 50 ml. of industrial benzine having a boiling point of 60 to 90° C. Then the benzine was vaporized and the $ZrCl_4$ was sublimed. The purified product contained 0.01% $FeCl_3$.

Example 4

Twenty gr. of impure $ZrCl_4$ containing 0.4% $FeCl_3$ were mixed with 50 ml. of $CCl_4$ containing 0.4 gr. of castor oil and the $CCl_4$ was distilled off. The sublimed $ZrCl_4$ contained only 0.006% $FeCl_3$.

Example 5

Twenty gr. of an impure anhydrous $ZrCl_4$ containing 0.4% $FeCl_3$ were dissolved at $-50°$ C. in 50 ml. of liquid $SO_2$. Four tenths gr. of motor oil was added to the solution, and the $SO_2$ was vaporized and the $ZrCl_4$ was sublimed. The product contained 0.008% $FeCl_3$.

Example 6

The test of Example 4 was repeated, but instead of castor oil paraffin, having a softening point of 60° C., was used. The sublimed $ZrCl_4$ contained 0.004% $FeCl_3$.

Example 7

The test of Example 4 was repeated, but instead of castor oil 0.4 gr. of tar was used. The sublimed $ZrCl_4$ contained 0.02% $FeCl_3$.

Example 8

Twenty gr. of an impure anhydrous $ZrCl_4$ containing 0.5% ferric chloride were mixed with 100 ml. of $CCl_4$ containing 0.6 gr. of paraffin. The surplus solution was filtered off under a vacuum. The remaining $CCl_4$ was vaporized and the $ZrCl_4$ was sublimed. A product containing 0.006% $FeCl_3$ was obtained.

Example 9

Twenty seven kg. of the impure solid chlorides obtained as a by-product of the chlorination of rutile and containing 54% $ZrCl_4$, 36% $FeCl_3$, 8% $AlCl_3$, 0.9% chlorides of silicon, 0.5% $TiCl_4$ and about 0.2% vanadium and 0.1% $CrCl_4$ were mixed with 30 l. of ethylene tetrachloride containing one l. of motor oil. The ethylene tetrachloride was distilled off and the $ZrCl_4$ was sublimed at a temperature from about 300 to 350° C. The sublimation was assisted by conducting a stream of dry nitrogen through the sublimation vessel. The vaporized $ZrCl_4$ was introduced into a condensing chamber constructed of steel. A cold stream of nitrogen was introduced into the $ZrCl_4$ vapor to assist the cooling and condensing thereof. Twelve kg. of $ZrCl_4$ having a snow white color and fine grain size were obtained. The analyses of the sublimate showed that it contained 0.05% $FeCl_3$, 0.08% $SiCl_4$, 0.01% $TiCl_4$ and 0.07% $AlCl_3$. Chromium and vanadium were not detectable in the product.

Example 10

Twenty kg. of the same solid chlorides as in Example 9 were intimately mixed with 0.75 l. of the same motor oil. No solvent was used. The mixture was heated and then the $ZrCl_4$ was sublimed. Six and six tenths kg. of zirconium chloride were obtained, containing 0.56% $FeCl_3$, 0.2% $SiCl_4$, 0.04% $TiCl_4$ and 0.38% $AlCl_3$. Chromium and vanadium were detected only as traces.

Example 11

Twenty kg. of the same solid chlorides as in Example 9 were sublimed directly without adding an organic, carbonizable substance. The sublimate showed substantially the same composition as the raw chloride. An attempt to obtain a separation by fractional condensation failed. No products having more than about 70% $ZrCl_4$ could be recovered.

The foregoing description constituting illustrative embodiments of the invention is not to be considered a limitation upon the invention, for the invention contemplates various adaptations, alterations, and modifications by those skilled in the art within the scope of the invention which is defined by the appended claims.

What is claimed is:

1. A process for the production of purified zirconium tetrahalide from an impure anhydrous zirconium tetrahalide containing halide impurities including ferric halide, said impure zirconium tetrahalide being normally solid and sublimable from solid state, which comprises heating said impure zirconium tetrahalide in intimate admixture with an organic substance that carbonizes in its presence at a temperature below its sublimation point, to a temperature at which the zirconium tetrahalide vaporizes, thereby carbonizing said substance, binding halide impurities with the carbonized substance, and vaporizing purified zirconium tetrahalide from the mass.

2. A process for the production of purified zirconium tetrahalide from an impure anhydrous zirconium tetrahalide containing halide impurities including ferric halide, said impure zirconium tetrahalide being normally solid and sublimable from solid state, which comprises heating said impure zirconium tetrahalide in admixture with an organic substance that carbonizes in the presence of said tetrahalide at a temperature below its sublimation point and is dissolved in a volatile anhydrous solvent, to a temperature at which it vaporizes, thereby carbonizing said substance, binding halide impurities with the carbonized substance, and vaporizing purified zirconium tetrahalide from the mass.

3. A process for the production of purified zirconium tetrahalide from an impure anhydrous zirconium tetrahalide containing halide impurities including ferric halide, said impure zirconium tetrahalide being normally solid and sublimable from solid state, which comprises heating said impure zirconium tetrahalide in intimate admixture with from 0.1 to 5% by weight of an organic substance that carbonizes in its presence at a temperature below its sublimation point, to a temperature at which the zirconium tetrahalide vaporizes, thereby carbonizing said substance, binding halide impurities with the carbonized substance, and vaporizing purified zirconium tetrahalide from the mass.

4. A process for the production of purified zirconium tetrahalide from an impure anhydrous zirconium tetrahalide containing halide impurities including ferric halide, said impure zirconium tetrahalide being normally solid and sublimable from solid state, which comprises heating said impure zirconium tetrahalide in intimate admixture with a fat that carbonizes in its presence at a temperature below its sublimation point, to a temperature at which the zirconium tetrahalide vaporizes, thereby carbonizing said substance, binding halide impurities with the carbonized substance, and vaporizing purified zirconium tetrahalide from the mass.

5. A process for the production of purified zirconium tetrahalide from an impure anhydrous zirconium tetrahalide containing halide impurities including ferric halide, said impure zirconium tetrahalide being normally solid and sublimable from solid state, which comprises heating said impure zirconium tetrahalide in intimate admixture with a normally solid hydrocarbon that carbonizes in its presence at a temperature below its sublimation point, to a temperature at which the zirconium tetrahalide vaporizes, thereby carbonizing said substance, binding halide impurities with the carbonized substance, and vaporizing purified zirconium tetrahalide from the mass.

6. A process for the production of purified zirconium tetrahalide from an impure anhydrous zirconium tetrahalide containing halide impurities including ferric halide, said impure zirconium tetrahalide being normally solid and sublimable from solid state, which comprises heating said impure zirconium tetrahalide in intimate admixture with an oil that carbonizes in its presence at a temperature below its sublimation point, to a temperature at which the zirconium tetrahalide vaporizes, thereby carbonizing said substance, binding halide impurities with the carbonized substance, and vaporizing purified zirconium tetrahalide from the mass.

7. A process for the production of purified zirconium tetrachloride from an impure anhydrous zirconium tetrachloride containing chloride impurities including ferric chloride in intimate admixture with an organic substance that carbonizes in its presence at a temperature below its sublimation point, to a temperature at which the zirconium tetrachloride vaporizes, thereby carbonizing said substance, binding chloride impurities with the carbonized substance, vaporizing purified zirconium tetrachloride from the mass by sublimation, and cooling the vaporized purified zirconium tetrachloride to form fine white grains.

8. A process for the production of purified zirconium tetrahalide from an impure anhydrous zirconium tetrahalide containing halide impurities including ferric halide, said impure zirconium tetrahalide being normally solid and sublimable from solid state, which comprises intimately mixing said impure zirconium tetrahalide with an organic substance that carbonizes in the presence of said tetrahalide at a temperature below the sublimation point of said tetrahalide, and heating the mixture under pressure to a temperature at which the zirconium tetrahalide becomes liquid and is distilled off, thereby carbonizing said substance, binding halide impurities with the carbonized substance, and vaporizing purified zirconium tetrahalide from the mass.

9. A process for the production of purified zirconium tetrahalide from an impure anhydrous zirconium tetrahalide containing halide impurities including ferric halide, which comprises mixing said impure zirconium tetrahalide with a small amount of an organic substance that carbonizes in the presence of said tetrahalide at a temperature below its sublimation point dissolved in a volatile anhydrous halide solvent, heating the mixture to a temperature at which the solvent is boiled off and further heating the mixture to a temperature at which the zirconium tetrahalide vaporizes, thereby carbonizing said said substance, binding halide impurities with the carbonized substance, and vaporizing purified zirconium tetrahalide from the mass, said volatile anhydrous solvent having its boiling point at least about 100° C. below the sublimation point of the zirconium tetrahalide.

10. A process for the production of purified zirconium tetrahalide from an impure anhydrous zirconium tetrahalide containing halide impurities including ferric halide, which comprises mixing said impure zirconium tetrahalide with a small amount of an organic substance that carbonizes in the presence of said tetrahalide at a temperature below its sublimation point dissolved in a volatile anhydrous hydrocarbon, said impure zirconium tetrahalide being normally solid and sublimable from solid state, to a temperature at which the zirconium tetrahalide vaporizes, thereby carbonizing said substance, binding halide impurities with the carbonized substance, and vaporizing purified zirconium tetrahalide from the mass, said volatile anhydrous hydrocarbon having its boiling point at least about 100° C. below the sublimation point of the zirconium tetrahalide.

11. A process for the production of purified zirconium tetrahalide from an impure anhydrous zirconium tetrahalide containing halide impurities including ferric halide, which comprises intimately mixing said impure zirconium tetrahalide with a solvent volatilizing at a temperature substantially below the sublimation point of said tetrahalide containing an organic substance that carbonizes in the presence of said tetrahalide at a temperature below the sublimation point of said tetrahalide, and heating the mixture to a temperature at which the solvent is boiled off, and further heating the mixture to a temperature at which the zirconium tetrahalide vaporizes, thereby carbonizing said substance, binding halide impurities with the carbonized substance, and vaporizing purified zirconium tetrahalide from the mass.

12. A process for the production of purified zirconium tetrahalide from an impure anhydrous zirconium tetrahalide containing halide impurities including ferric halide, which comprises intimately mixing said impure zirconium tetrahalide with a solvent volatilizing at a temperature substantially below the sublimation point of said tetrahalide containing ingredients convertible in the presence of the impure zirconium tetrahalide into an organic substance that carbonizes in the presence of said tetrahalide at a temperature below the sublimation point of said tetrahalide, and heating the mixture to a temperature at which the zirconium tetrahalide vaporizes, thereby converting said ingredients into said organic substance, volatilizing the solvent, carbonizing said substance, binding halide impurities with the carbonized substance, and vaporizing purified zirconium tetrahalide from the mass.

References Cited in the file of this patent

UNITED STATES PATENTS

| Number | Name | Date |
|---|---|---|
| 2,592,021 | Frey et al. | Apr. 8, 1952 |